United States Patent
Bruchlos et al.

(10) Patent No.: US 10,397,342 B2
(45) Date of Patent: Aug. 27, 2019

(54) WEB SERVICE CONTRACT SELECTION

(75) Inventors: Joachim Bruchlos, Calw (DE);
Joachim Hagmeier, Stuttgart (DE);
Timo Kussmaul, Boeblingen (DE)

(73) Assignee: International Busniess Machines Corporation, Armonk, NY (US)

( * ) Notice: Subject to any disclaimer, the term of this patent is extended or adjusted under 35 U.S.C. 154(b) by 3373 days.

(21) Appl. No.: 10/572,990

(22) PCT Filed: Sep. 16, 2004

(86) PCT No.: PCT/EP2004/052200
§ 371 (c)(1),
(2), (4) Date: Feb. 7, 2007

(87) PCT Pub. No.: WO2005/029377
PCT Pub. Date: Mar. 31, 2005

(65) Prior Publication Data
US 2007/0233690 A1    Oct. 4, 2007

(30) Foreign Application Priority Data

Sep. 24, 2003 (EP) .................................... 03103545
Sep. 30, 2003 (EP) .................................... 03103624

(51) Int. Cl.
  *H04L 29/08* (2006.01)
  *G06Q 30/02* (2012.01)
  *H04L 29/06* (2006.01)

(52) U.S. Cl.
  CPC ............ *H04L 67/16* (2013.01); *G06Q 30/02* (2013.01); *H04L 29/06* (2013.01); *H04L 67/02* (2013.01); *H04L 67/142* (2013.01); *H04L 69/329* (2013.01)

(58) Field of Classification Search
  CPC ........ G06Q 50/18; G06Q 30/02; H04L 67/16; H04L 29/06; H04L 67/02; H04L 69/329
  (Continued)

(56) References Cited

U.S. PATENT DOCUMENTS 6,148,290 A * 11/2000 Dan et al. ................... 705/1.1
2002/0178120 A1 * 11/2002 Reid et al. .................. 705/59
(Continued)

FOREIGN PATENT DOCUMENTS

JP    2003162675    6/2003
WO    02091756 A1   11/2002

OTHER PUBLICATIONS

"SOAP Version 1.2 part 1: Messaging Framework", W3C, Oct. 2, 2001.*
(Continued)

*Primary Examiner* — Carrie S Gilkey
(74) *Attorney, Agent, or Firm* — Steven M. Greenberg, Esq.; Shutts & Bowen LLP (57) ABSTRACT

The present invention refers to the field of networked computer telecommunication, and in particular to a method and system for processing contract data defining contracts between a service requester and a service provider for services like Web Services to be provided via a network. In order to improve the processing of web services in presence of a multitude of valid contracts between binding a Service Consumer (SC) it is proposed to include (1300) said contract data into a request for said service in order to enable the Service provider to evaluate (1330) and select (1340) a particular contract out said multitude in order to match best the needs of the Consumer.

19 Claims, 9 Drawing Sheets

(58) Field of Classification Search
USPC .................................................. 705/1, 1.1
See application file for complete search history.

(56) References Cited

U.S. PATENT DOCUMENTS

2003/0172110 A1   9/2003  Kunisetty ............... G06F 15/16
2005/0198111 A1*  9/2005  Lamb et al. ................. 709/203

OTHER PUBLICATIONS

Venkatapathy C. et al. "An Introduction to Web Services Gateway" IBM Developer Works, May 1, 2002 (May 1, 2002), XP002288276 the whole document.
Mikio Aoyama, "Creation of Next Generation Information Systems Based on Software Services Engineering", The Transactions of the Institute of Electrical Engineers of Japan, May 1, 2002, p. 737-p. 743, vol. 122-C, No. 5, The Institute of Electrical Engineers of Japan, Japan.
Yukiyasu Hirose, "Business Utilization of XML", INTERNET magazine, Dec. 1, 2000, No. 71, p. 221-p. 228, Impress Corp., Japan.

* cited by examiner

```
POST /StockQuote HTTP/1.1
Host: www.stockquoteserver.com
Content-Type: text/xml; charset="utf-8"
Content-Length: nnnn
SOAPAction: "http://example.org/2001/06/quotes"

<env:Envelope xmlns:env="http://www.w3.org/2001/06/soap-envelope" >
 <env:Body>
  <m:GetLastTradePrice
     env:encodingStyle="http://www.w3.org/2001/06/soap-encoding"
     xmlns:m="http://example.org/2001/06/quotes">
   <symbol>IBM</symbol>
  </m:GetLastTradePrice>
 </env:Body>
</env:Envelope>
```

FIG. 1 PRIOR ART

```
<Method> <request-URI> <HTTP-version>
Header field 1
...
Header field n
(blank line)

Message body
```

FIG. 2 PRIOR ART

```
<SOAP:Envelope>
    <SOAP:Header>
    Header field 1
    ...
    Header field n
    </SOAP:Header>
    <SOAP:Body>
    Body field 1
    ...
    Body field n
    </SOAP:Body>
</SOAP:Envelope>
```

FIG. 3
PRIOR ART

```
<Method> <request-URI> <HTTP-version>
Header field 1
. . .
Header field n
(blank line)
<SOAP:Envelope>
    <SOAP:Header>
    Header field 1
    . . .
    Header field n
     </SOAP:Header>
    <SOAP:Body>
    Body field 1
    . . .
    Body field n
     </SOAP:Body>
</SOAP:Envelope>
```

FIG. 4 PRIOR ART

```xml
<?xml version="1.0"?>
<definitions name="StockQuote"
targetNamespace="http://example.com/stockquote.wsdl"
    xmlns:tns="http://example.com/stockquote.wsdl"
    xmlns:xsd1="http://example.com/stockquote.xsd"
    xmlns:soap="http://schemas.xmlsoap.org/wsdl/soap/"
    xmlns="http://schemas.xmlsoap.org/wsdl/">

<types>
    <schema targetNamespace="http://example.com/stockquote.xsd"
      xmlns="http://www.w3.org/2000/10/XMLSchema">
    <element name="TradePriceRequest">
    <complexType>
      <all>
        <element name="tickerSymbol" type="string"/>
      </all>
    </complexType>
    </element>
    <element name="TradePrice">
    <complexType>
      <all>
        <element name="price" type="float"/>
      </all>
    </complexType>
    </element>
   </schema>
  </types>

<message name="GetLastTradePriceInput">
    <part name="body" element="xsd1:TradePriceRequest"/>
  </message>
```

FIG. 5A PRIOR ART

```xml
<message name="GetLastTradePriceOutput">
  <part name="body" element="xsd1:TradePrice"/>
</message>

<portType name="StockQuotePortType">
  <operation name="GetLastTradePrice">
    <input message="tns:GetLastTradePriceInput"/>
    <output message="tns:GetLastTradePriceOutput"/>
  </operation>
</portType>

<binding name="StockQuoteSoapBinding" type=
    "tns:StockQuotePortType">
  <soap:binding style="document" transport=
    "http://schemas.xmlsoap.org/soap/http"/>
  <operation name="GetLastTradePrice">
    <soap:operation soapAction=
      "http://example.com/GetLastTradePrice"/>
    <input>
     <soap:body use="literal"/>
    </input>
    <output>
     <soap:body use="literal"/>
    </output>
  </operation>
</binding>

<service name="StockQuoteService">
  <documentation>My first service</documentation>
  <port name="StockQuotePort" binding="tns:StockQuoteBinding">
    <soap:address location=
      "http://www.stockquoteserver.com/StockQuote"/>
  </port>
</service>
</definitions>
```

WEB SERVICE CONTRACT SELECTION

1. BACKGROUND OF THE INVENTION

1.1. Field of the Invention

The present invention refers to the field of networked computer telecommunication, and in particular to a method and system for processing contract data defining contracts between a service requester and a service provider for services like Web Services to be provided via a network.

1.2. Description and Disadvantages of Prior Art

1.2.1. Introduction

Web services define a technique for describing software components to be accessed, methods for accessing these components, and discovery methods that enable the identification of relevant service providers. Web services are programming language-, programming model-, and system software neutral.

In this regard, two prior art Web services standards are relevant. They are shortly sketched out and commented as follows in order to introduce into the problems concerned in prior art:

First, the Simple Object Access Protocol (SOAP) provides a means of messaging between a service provider and a service requester. SOAP is independent of the underlying transport protocol, SOAP payloads can be carried on HTTP, FTP, JMS and other protocols.

Figure 1:
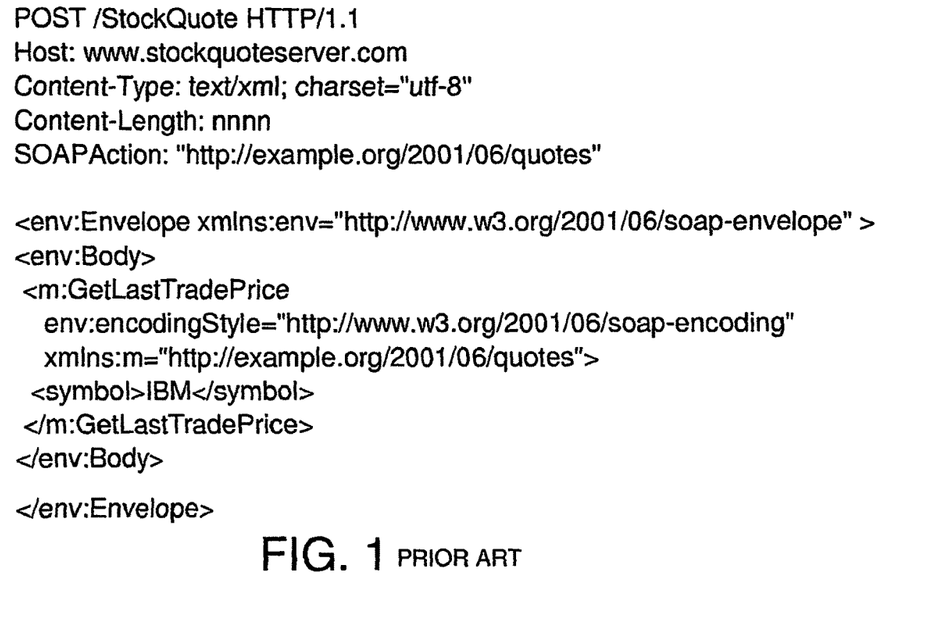
FIG. 1 is a code section representation showing a prior art SOAP request message contained in a HTTP POST request message.

FIG. 1 gives a SOAP example carried by the HTTP POST request.

HTTP messages consist of requests from client to server and responses from server to client. Both types of message (Request and Response messages) consist of a start-line, zero or more header fields (also known as "headers"), an empty line indicating the end of the header fields, and possibly a message-body.

Figure 2:
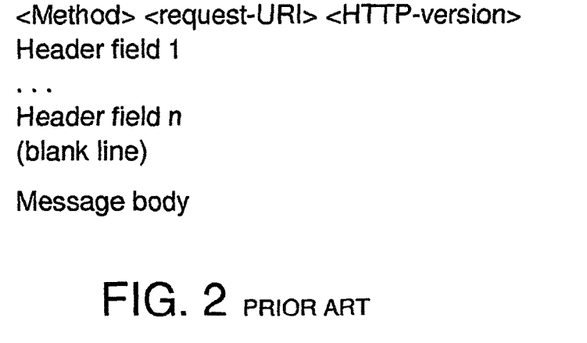
FIG. 2 is a code section representation showing the structure of a prior art HTTP request.

The structure of a HTTP request message is depicted in FIG. 2: the first line of that message specifies the method to be applied to the resource, the identifier of the resource, and the HTTP protocol version in use. The HTTP protocol defines multiple request methods like GET, HEAD, POST, PUT, DELETE, TRACE, CONNECT, OPTIONS. The method indicates the operation to be performed on the resource.

The resource upon which to apply the request is identified by a Request-URI, which is a Uniform Resource Identifier. Uniform Resource Identifiers are simply formatted strings, which identify—via name, location, address or any other characteristic—a resource. For example: The well-known HTTP URL scheme used to locate network resources via the HTTP protocol contains resource-URIs. The scheme specific syntax and semantics for http URLs are http_URL="http:"//"host [":"port][request-uri]

If the port is empty or not given, port 80 is assumed. The semantics are that the identified resource is located at the server listening for TCP connections on that port of that host, and the Request-URI identifies the resource. The syntax and semantics for Request-URI are Request-uri=abs_path ["?" query-string]

where the abs_path is an identifier of the resource and the query string is any kind of information which can be used for processing the request.

The header fields carry meta-information associated with the request or response.

The message-body of an HTTP message is used to carry the entity-body associated with the request or response.

Figure 3:
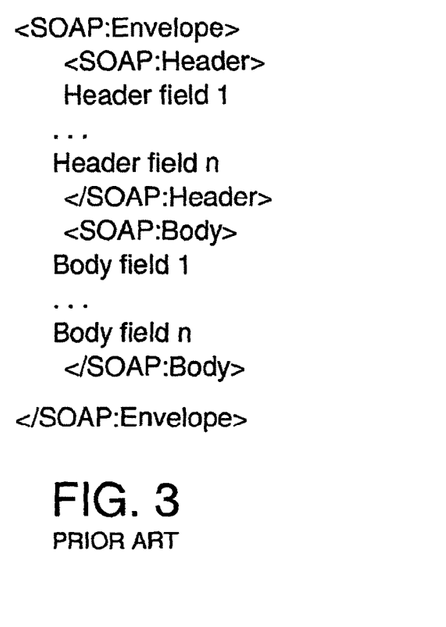
FIG. 3 is a code section representation showing a detail structure of a prior art SOAP message.

The message body depicted in FIG. 2 contains the actual SOAP message, which has a structure as given in FIG. 3:

Inside an envelope section a number of header fields 1, . . . n are defined, which construct the so called SOAP header, which is followed by the actual SOAP body, which comprises a second number of so called "Body fields 1, . . . n.

Figure 4:
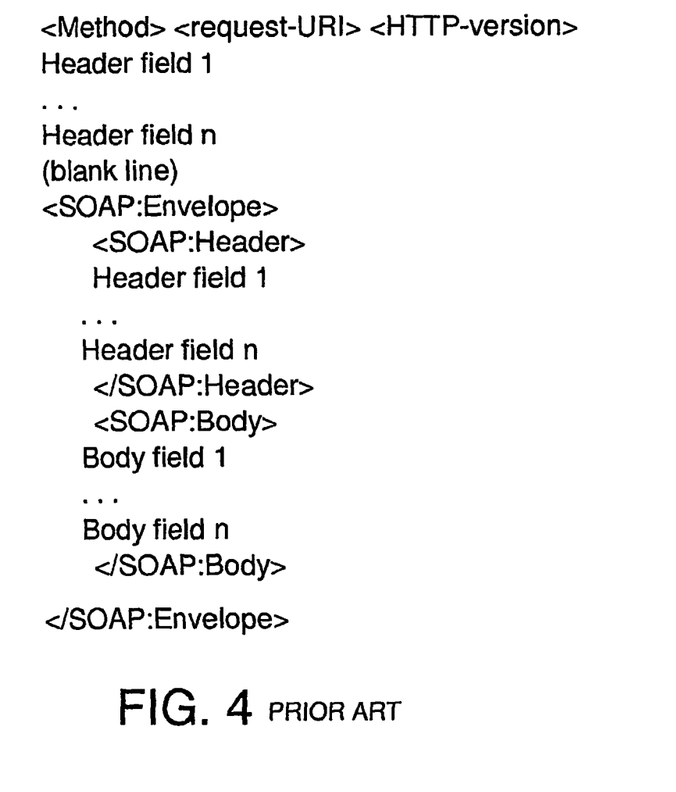
FIG. 4 is a code section representation showing the overall structure of a prior art SOAP message contained in a HTTP POST request message.

Thus, the overall structure of a SOAP message carried over a network e.g. by a transport protocol like HTTP is depicted as a conglomeration of FIGS. 1 to 3 in FIG. 4.

FIG. 1 gives a SOAP example carried by the HTTP POST command. The HTTP request method is POST, the resource-URI is "/StockQuote", which is an absolute path identifying the resource for which the request is intended. The resource-URI does not contain a query string.

Beside SOAP, there is in prior art the above-mentioned second relevant Web Service standard:

The Web Services Description Language (WSDL) is an XML document for describing Web Services as a set of endpoint operations on messages containing either document-oriented or Remote Procedure Call (RPC) payloads.

So called service interfaces are defined abstractly in terms of message structures and sequences of simple message exchanges (or "operations" in WSDL terminology). They are then bound to a concrete network protocol and data-encoding format to define an endpoint. Related concrete endpoints are bundled to define abstract endpoints (services).

Figure 5A:
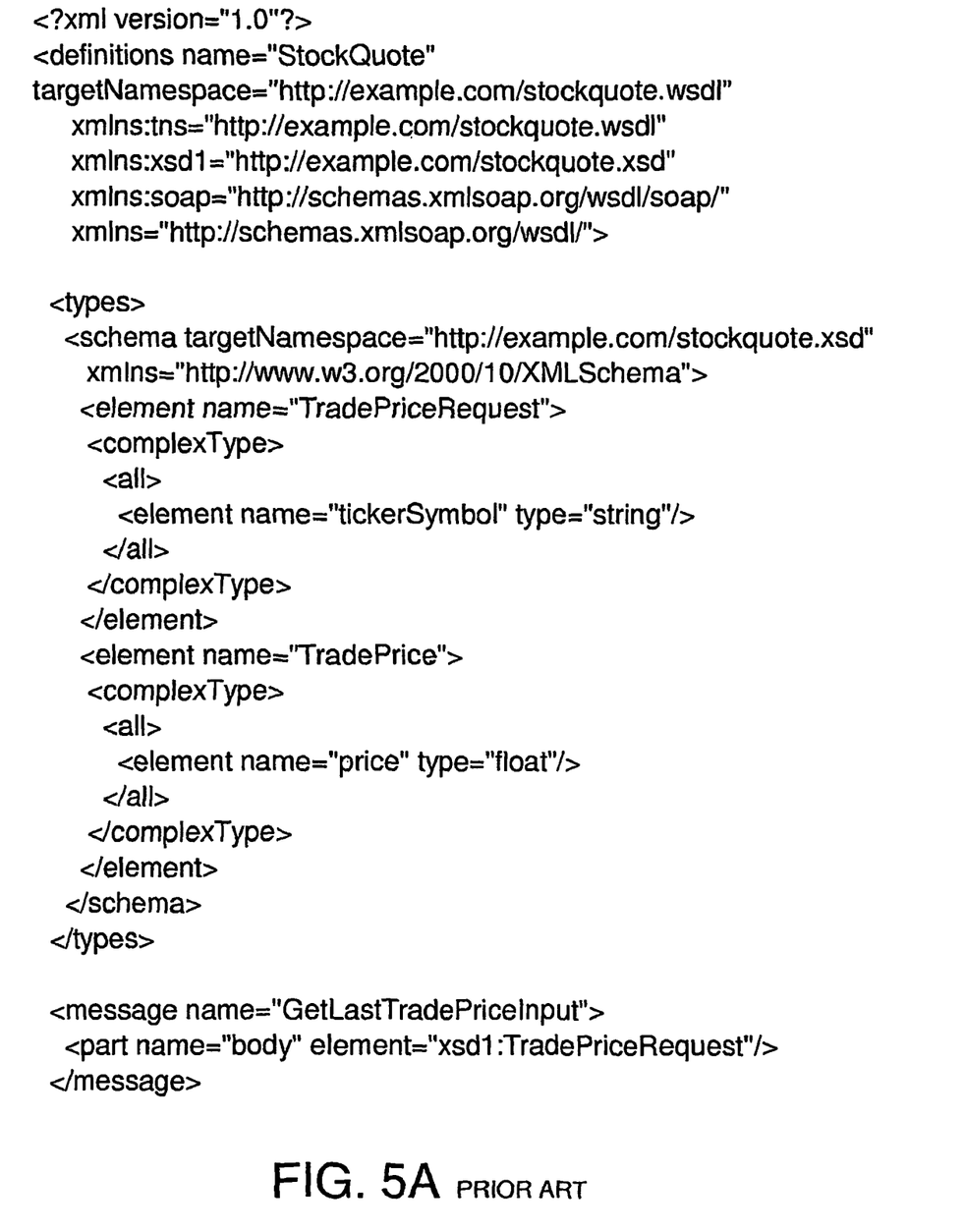
FIG. 5A is a code section representation showing a section of a prior art exemplary WSDL document used for describing web services.
Figure 5B:
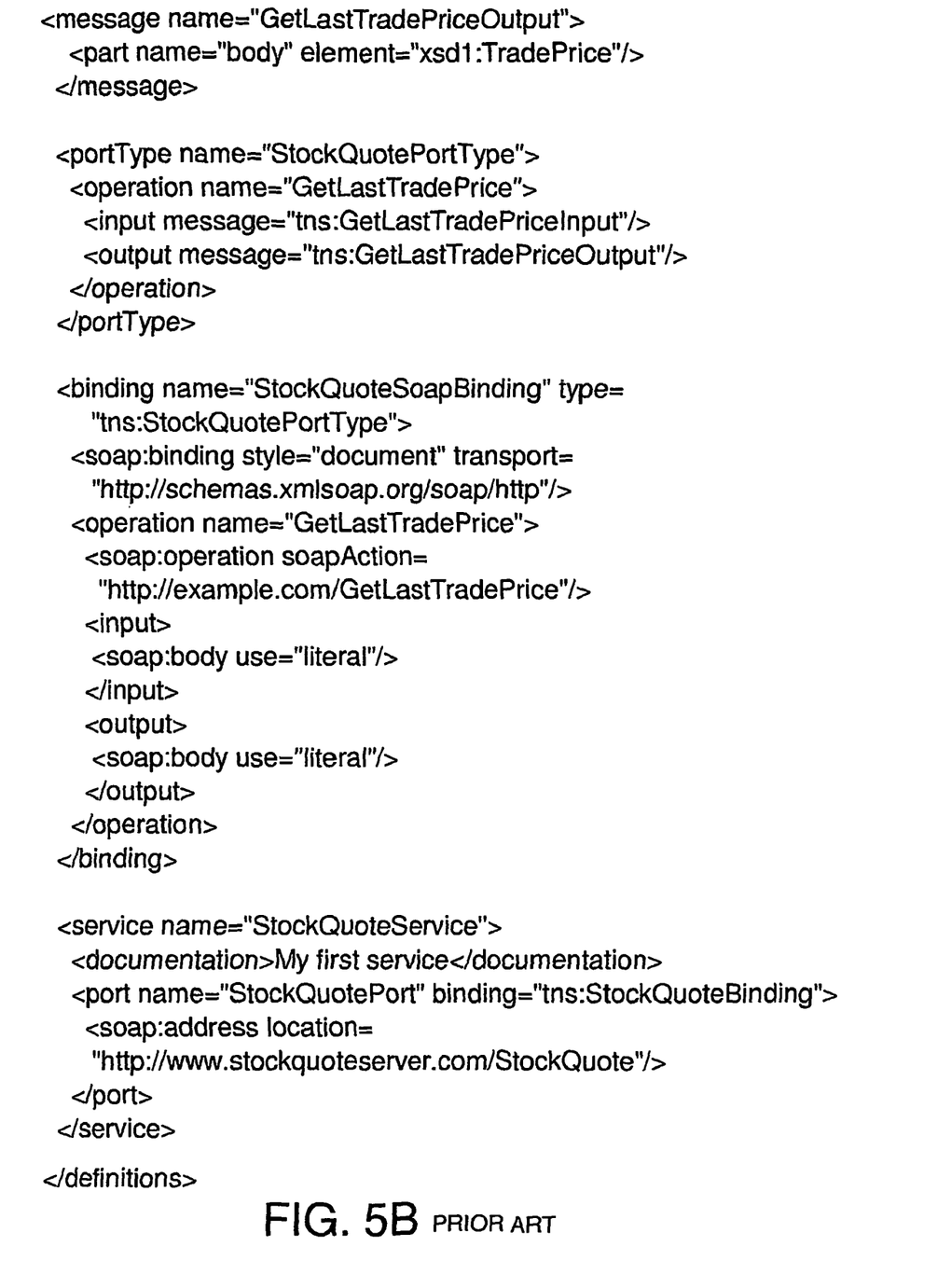
FIG. 5B is the continuation of FIG. 5A.

WSDL supports a service interface definition that is distinct from the protocol bindings used for service invocation. WSDL allows for multiple bindings for a single service. The service interface definition and the access binding are also distinct from the implementation of the functionality of the service. Service requesters usually generate client stub code for a web service from the corresponding WSDL; the WSDL of a service is usually requested from the service provider. The client stub code implements the necessary logic to create the correct message structure and the correct data encoding to address the endpoint. Since there is a distinction between definition, binding and implementation of a service, client stub codes created for a certain definition and binding can usually address various endpoints without requiring code changes, simply by using another endpoint address. FIG. 5A and the continuation thereof, FIG. 5B is given to disclose an exemplary WSDL document with further details to a person skilled in the art.

An important feature of Web Services is that they are stateless, according to a request-response scheme. A stateless server is one, which treats each request as an independent transaction, unrelated to any previous request. This simplifies the server design because it does not need to allocate storage to deal with conversations in progress or worry about freeing it if a client dies in mid-transaction. A disadvantage is that it may be necessary to include more information in each request and this extra-information will need to be interpreted by the server each time.

Having now described the constraints in which electronic communication of the above-mentioned kind runs, the disadvantages of prior art will be described next below:

Commercial usage of web services is based on a contract concluded between the service provider and the service requester. Such contract represents an agreement about the conditions for using and provisioning web services or web applications. The contract details may specify the conditions for billing the service, i.e. the price, service levels specifying the desired quality of service in a more detailed way, and further information which is highly critical for both the service requester and the service provider. Basically, in prior art business, there are no limitations regarding the scope of a contract or the number of contracts: one contract may contain multiple services, or one service may be contained in multiple contracts, which are all valid at the same time.

In a typical prior art scenario, either two parties, ie, the Service Requester or Service Consumer, referred to herein as SC, and the Service Provider, referred to as SP, communicate, or three parties are comprised of the Web service Communication, ie the Service Requester, the Service provider who manages the above contracts and the Service Supplier, referred to as SS, which actually performs the service, which is sometimes hold invisible to the requester.

The only disclosure of such prior art, which is thus elaborated to address the above-mentioned web services facilities is published in "IBM Web Services Toolkit", "Emerging Technologies Toolkit", available in the year of 2002 for a trial period of 60 days under www.alphaworks.com.

A short review on a software component as it is disclosed there, which is called "Contract Service" and comprises the most technical features relevant for the present invention is given, as follows:

The Contract Service handles the relationship between service providers and service requestors. It provides information about the type of contract between a service provider and the service hub (deployment contracts, also known as provider contracts) and between a service requestor and the service hub (usage contracts). Usage contracts can be used to subscribe to any combination of operations of any service provided through the service hub. A usage contract contains information such as how calls to service operations are to be charged for (by time, by number of uses, by amount of use etc.) and how much the subscribed service operations should cost for that client. For each usage contract the Contract Service defines the payment method and rating model to be used, the effective dates for that contract. Contracts may optionally store the digital signatures of both parties (service hub and service provider/requestor) to the contract. In the Utility Service demo that is shipped with the Web Services Toolkit, contracts are added to the Contract Service via a Utility Services Portal supplied with the demo, and a valid contract must be in place between a service hub and a service requestor before the requestor can use the service.

The Contract Service supports WSDL-defined operations such as the following:
- createContract for creating a contract;
- getContractModel for reading a contract model;
- getContractState for reading the current status of a contract;
- updateConstractState for updating the current status of a contract;
- getContractType for reading the type of a contract;
- setContractProperty for setting the properties of a contract;
- getContractProperty for reading the properties of a contract;
- getUsageContractsForValidForIdentity for retrieving usage contracts, which are valid for a given Service consumer When now a service request arrives at the server, the contracting service described above checks the contracts being relevant for the service request prior to execution of the request. As long as only one contract exists and the underlying service can be performed in a single way without the possibility to differentiate into multiple levels of quality of service, the service can be provided without any further problem.

Due to the steadily increasing offering and use of web services, however, those web services split up into a large variety of quality levels, in which they may be provided by a respective service provider. For example, a service may be provisioned very quickly which makes the service more expensive compared to a longer "service provision time". Or, the information given by the service may be more or less elaborate and thus may give more or less details to the service requester, for example the respectively varying contents of an economic information system. Thus, a respective multiple number of contracts or contract attributes are valid and binding between service provider and service requester. In this situation, say, if multiple contracts or contract attributes are relevant and valid, the above-mentioned contracting service has to select the actual contract to be used for the request or to use the actual contract attribute in case one single contract specifies a respective number of contract attributes for different quality levels of a service. The selected contract or contract attribute specifies then the current conditions for the current service request, e.g. the price of the operation, as mentioned above.

As the requests sent over the network do not contain any kind of contract specification or contract related information, a client at the service requester side in prior art cannot select the actual contract to use for a specific service request in such multiple contract situation, nor the client can influence the process of selection. In other words: the precise conditions, under which a request is provisioned and is in effect for the requester, are selected in prior art by a foreign party, i.e. by the service provider. This disadvantage is based in particular upon the fact that the existing web service protocol standards, as UDDI, WSIL, WSDL, SOAP, do not consider any methods for selecting contracts for an operation or service request.

The unsatisfying handling of this problem means that either the service provider selects the actual contract or actual contract attribute, while the requester has no influence on said selection, or a complicated service structure is used, which is organised such that for each granular quality level for the same service a separate contract is defined and thus one and the same service splits up logically and formally into a respective number of services. This however, renders the man-machine-interface for a Service Consumer complicated and difficult to use.

1.3. Objectives of the Invention

It is thus an objective of the present invention to provide improvements to the method according to the preamble of claim 1, and a respective system for performing the method, wherein the above mentioned disadvantages are avoided or at least reduced.

2. SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

According to the basic aspect of the present invention a method as defined in the preamble of claim 1 is further improved by the step of including contract data specifying a selection of a given service specification into the request, with which the service is requested.

By this general feature of the present invention the contract service software component residing at the service provider side may easily be implemented such that it may extract such contract data from the request and evaluate it according to predetermined rules enabling the service provider to provision exactly that quality of service, which the service provider requested by aid of the above-mentioned contract data.

According to a preferred feature of the present invention said contract data is processed via respective software interfaces residing both at the client, and at the server side, and which comprise said contract data, wherein said interfaces comprise respective definitions of the transport protocol in use, of the messaging protocol in use and on an associated port type in use. Of course, such software interfaces must be programmed and managed according to the respective current type and version of the service, as such services may be changed due to further development over time.

Further, according to a further preferred aspect of the present invention said contract data may be processed within the header fields of a web service request message.

In this case the request-evaluating software component must of course extract such header field contents accordingly, which requires respective programming thereof.

According to the most preferred aspect of the present invention said contract data is comprised and processed as a part of the endpoint specification of a respective service request. This feature defines a way that enables the client and the service requester to select one or multiple contracts for a service request, while the existing web service protocols and infrastructure can be used without changes.

The message itself, constituting a service request and sent to the server by the client, contains thus information, which is used by the server to select one or multiple contracts.

Further, the contract selection parameters may refer basically to the content of a contract or to meta data just identifying a particular contract.

Content is referred to, when the service quality is directly addressed as for example when service performance conditions or service content conditions are exemplarily defined as:

a) Price of service <fixed upper price limit, for instance 10 USD, or
b) response time smaller or equal 0.5 seconds, or
c) availability of service greater than 90%, or
d) other criteria, for instance also addressing the complexity of the provided service, as for example short summary-like information on the one hand, or detailed reports on the other hand.

An example for contract meta data in the above sense is, when for example a contract is specified according to a unique ID, consisting of a plurality (e.g. 30) of identifying characters.

It should be noted further, that according to a preferred aspect of the invention also combinations of the above mentioned contract selection criteria can be specified by the service consumer (requester) or can be offered by the service provider.

An example is a request specifying contract ID "hhffkk-rrsslloo-ooddggjj-idghwelf-oodbmmss- combined with the requirement of above a) AND b) OR a) AND c).

As reveals from the appended claims, the present invention can be considered as distributed between the requester and the provider software/hardware systems, wherein in particular the provider side may also split up into two or more separate institutions as it was mentioned above with service provider (also called service hub) and service supplier. Due to said distributed nature specific claims exist for the server part and for the client part, respectively. This includes also the possibility to distribute the inventional functionality over more than one single hardware system at either, provider or requester site. For example, the respective requester site or provider site steps of the inventional method can be implemented either in part or entirely in an interceptor computer, arranged as a gateway component integrated in an enterprise's firewall concept for intercepting and processing the incoming messages before they are actually forwarded to dedicated server systems including the actual respective database applications.

The principle advantage of the present invention is that the client is enabled to select the contracts and thus the conditions for the desired service. Since the parameters specifying contract selections are part of the request messages constituting the service requests, the present invention is well suited for stateless web services.

The present invention uses and leverages existing standard web service protocols. According to its most preferred feature it does not require extensions of existing web service infrastructure and is transparent to both, the web service infrastructure and the service implementation. It is therefore well suited for heterogeneous environments like for example, .NET and JAVA web services. Thus, a broad variety of services based on a respective variety of contract features and alternatives can be performed via a network without changing the service interfaces in the case, in which the contract data is processed as a part of the endpoint specification of the service request, which is the most preferred alternative mentioned herein. In this case no service interfaces—neither hardware nor software—need to be changed, all messages transmitted via network still conform to the standards and tools for building client proxies in prior art, and client application programming interfaces (APIs) can still be used.

The term "endpoint" of a message denotes the resource (any kind of hardware or software resource), which either sends or receives a message. The term "endpoint" of a request denotes the resource, which either submits the request or is intended to receive and execute the request. The term "endpoint specification" denotes the identifier of such resources. Any kind of endpoint specification representation is possible. Typically, an endpoint specification is given as HTTP-URL or request-URI.

FIG. 1 contains the endpoint specification given as request-URI "/StockQuote".

In relation to Webservices, an endpoint is a resource, which either receives messages of a specific format or realizes a specific operation characterized by the specific format of the request and response messages, the specific data encoding and the specific network protocol. An endpoint typically is specified by a protocol-level endpoint address, e.g. an HTTP-URL or a request-URI.

By a "stateless" request is meant that a request is handled as separate transaction and is not related to any other (previous or future) request. Typically, a request is processed by the server, and the response is returned immediately, then all information on the server related to this request is deleted.

In other words, the server does not save the state of a request after the request is processed.

3. BRIEF DESCRIPTION OF THE DRAWINGS

The present invention is illustrated by way of example and is not limited by the shape of the figures of the drawings in which.

4. PREFERRED EMBODIMENTS

Next, a preferred implementation of the inventive method and system are described wherein a focus is laid on the runtime behavior of the inventional contracting system, i.e. the behavior when a service request is processed.

Basically, the contracting system must
1) verify that the actual incoming service request accords to at least one valid contract and
2) retrieve. the usage conditions specified by the contract for this service request.

The contracting system according to the invention may support arbitrary contract types; each contract is an instance of one contract type. The different contract types are based on the same data model, ie all contracts contain a state (active, inactive or deleted), a reference denoting the contract type and the contract document. This may be a XML structure, which contains the individual contracting data, ie the contract items, i.e. service operations, and the terms and conditions for using it. The format of the contract document depends on the contract type.

For illustrative purposes only one contract type is described in more detail:

A contract of the type "Usage", ie a Usage Contract represents an agreement between one Service Consumer and one Service Provider.

Each usage contract is associated with the Service Consumer's specific identity. In a typical scenario, the contract system runs on the side of the Service Provider, therefore the Service Provider identity is not explicitly contained in the usage contract, but given implicitly.

The Service Provider uses the contracting system to ensure that a Service Consumer can only invoke service operations covered by valid usage contracts. It should be noted that a consumer can have multiple valid contracts for one service operation.

The usage contract contains a contract name, the identity key of the consumer i.e., the service requester, a start and end date. It comprises one or multiple service elements specifying the key of a service operation and the key of the associated rating. In this example surrogate keys are used, but depending on the actual implementation, other types of key can be used as well. The rating model specifies how calls to service operations are to be charged for (by time, by number of uses, etc.) and how much the subscribed service operations should cost for that consumer. This yields from the following Listing:

```
<UsageContractDoc
                        name        = MyUsageContract
                        identitykey = 313c4dbb-14aa-47c3-84b8-
01718f60116
                        startdate   = 2002-07-01
00:00:00.000000000
                        enddate     = 2003-07-01
00:00:00.000000000 >
    <services>
        <service servicekey = c1f2376-043a-4294-a6ef-
0c131cf2243a
                 ratingkeys =3312d44b-3163-4d42-bd5e-66d305e2914
    />
        <service servicekey = ec01bb7-331e-4e89-8256-
3e0b0c3b1335
                 ratingkeys =1a2fdeed-026c-47a9-be32-fb63896303d
    />
    </services>
</UsageContractDoc>
```

Beyond this sample contract type, this basic architecture allows to easily add other contract types. Contracts of other types may specify quality of service attributes, i.e. response time, availability etc.

In the following, two typical runtime scenarios are shown and the interaction between the Service Consumer, the Service Provider and the Service Supplier is illustrated. It should be noted that it does not fall into the scope of the present invention, how the contracts in question are created, as they may be concluded, before said scenario starts, via multiple ways, for example via "classic" written correspondence, but it is assumed that one or multiple valid contracts are in place before a service is requested.

Figure 6:
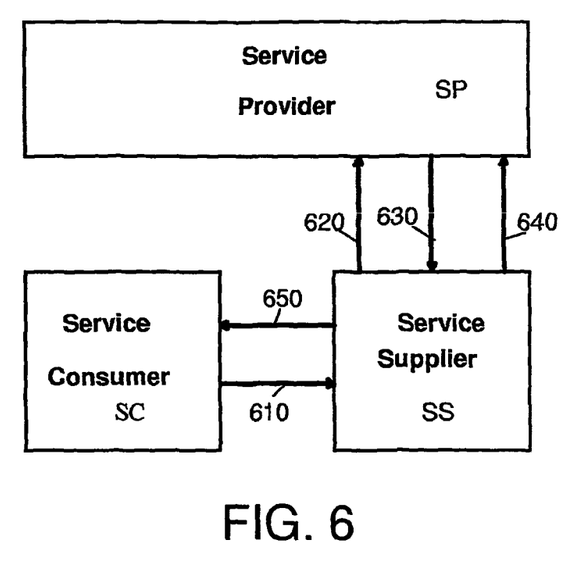
FIG. 6 is a schematic representation of the relationships between Service Consumer, Service Supplier and Service provider according to a preferred embodiment of the inventional method.

With reference to FIG. 6 a scenario is described in which the service supplier abbreviated further as SS offers the service to the Service Consumer, abbreviated as SC. The Service Provider abbreviated as SP realizes the main part of the contract management infrastructure including the main inventional software components.

This results in the following interactions, which are implemented according to this embodiment in the respective program module(s) as "steps" of a respective inventional method used by the parties A, B, and C. The steps are enumerated as depicted in the drawing:

Step 610: SC initiates a service request in order to invoke a business service, which is provided by SS. SS receives the request.

Step 620: SS sends a service request to SP in order to use the contracting system and infrastructure services provided by the SP. In particular, in this embodiment the contracting system services comprise the contracting service, and the infrastructure services are metering service and profiling service.

Step 630: SP performs the requested contracting system and infrastructure services, e.g. verifies that a valid contract is available, initiates a meter event and returns the status to SP.

Step 640: SS performs the requested service and invokes SP in order to generate adequate meter events.

Step 650: SS sends data representing the service result to SC.

Figure 7:
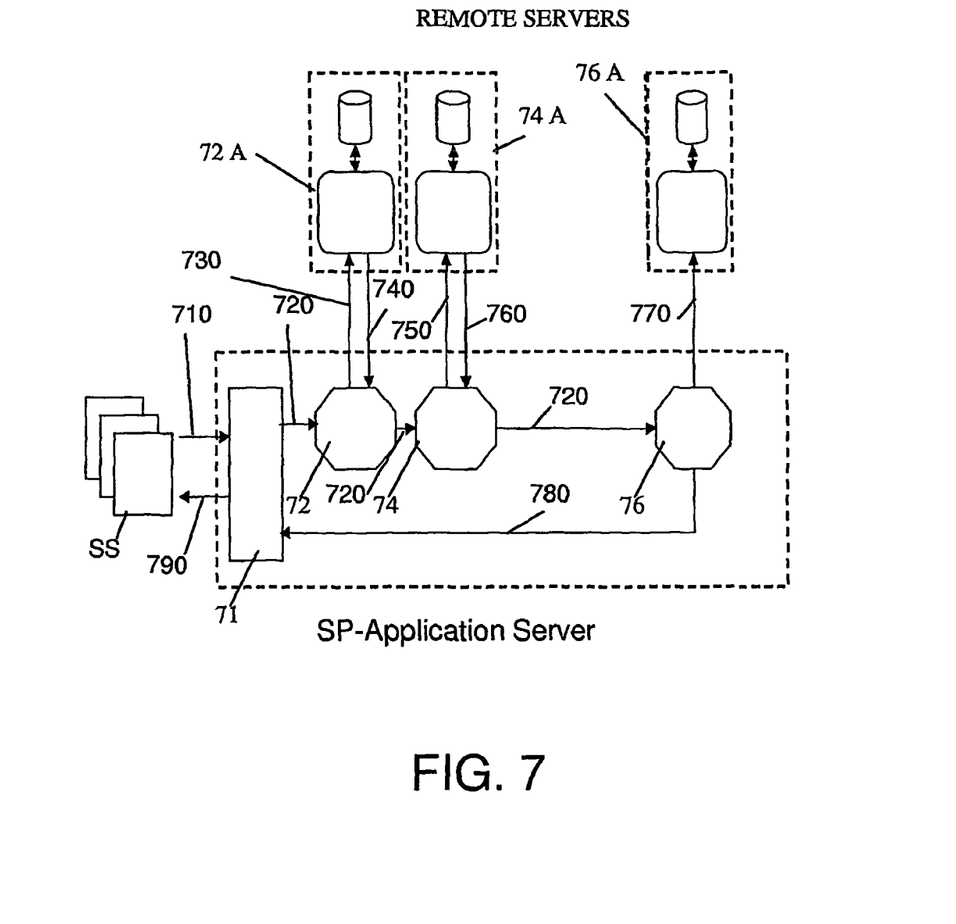
FIG. 7 is a schematic representation of the main structural elements being used in the scenario given in FIG. 6.

The implementation of step 620 is shown in FIG. 7 in more detail: The service provider realizes an application server, depicted with a dotted-line frame, which contains a servlet 71, implementing the runtime environment for service requests, for example a web service runtime environment like Apache Axis.

The application server also contains multiple handler components denoted with reference signs 72, 74, 76. These handlers realize a local implementation of the infrastructure components F-H, which may be realized on remote servers for example as further web services. The handlers 72, 74, 76 provide local functionality needed to handle the communication with the remote services:

A Profile Handler 72 uses external Profile Service in order to verify the requester's identity.

A Contract Handler 74 uses external Contract Services in order to verify the contract state and contract validity.

A Metering Handler 76 generates adequate meter events (start-, end-, adhoc-, cancel events, etc)

The components 71, 72, 74, 76 (servlet and handlers) run in a shared memory environment and communicate through shared data. The servlet 71 ensures that the handlers are invoked in the correct order.

The infrastructure services are described next below:

The Profile Service (72A) may be basically used as available in above-described prior art.

The Profile Service provides access to user profile information like name, address, user-ID, etc. Depending on the implementation, this may be expanded to include more information. The Profile Service may be used to save, delete and get profile information.

For the other services to work correctly, all users of business services must have a profile assigned by the Profile Service. Profiles may be created in advance by using a user interface or by directly editing the XML file that holds profiles. This Profile Service can be replaced by any other identity system like Tivoli Identity Manager.

The Contract Service 74A implements the inventional contracting concept and supports WSDL-defined operations such as the following:

createContract—creates a contract
getContractModel—retrieve information and content of a contract
getContractState—get actual state of a contract
updateConstractState—set state of a contract (e.g. ACTIVE, INACTIVE)
getUsageContractsForValidForIdentity—retrieve usage contracts, which are valid for a given Service consumer.

The Metering Service 76A receives meter events, as explained below, persistently stores the meter events and retrieves meter events upon request. According to this preferred embodiment the Metering Service may be used in conjunction with contract information from the Contract Service 74 to produce a usage report for a particular client using a particular service. It should be noted that the contract service and the meter service do not interact directly.

The Metering Service 76A supports three types of operations:

recordMeterEvent—saves one meter event
recordMeterEvents—saves multiple meter events
getMeterEvents—retrieves multiple meter events from the Meter Service Meter events contain the service name and the operation name of the service that was called, timestamps, as well as the ID of the contract used to handle the request. Meter events vary by type, so various ways of charging a service call are possible:

Start/end events are used when access to a service is charged by the amount of time used to perform the service;

ad-hoc events are used when access is charged for by the number of times that the service is accessed, or on some other basis besides time.

In addition to the above, two more types of events are available:

a) The event "cancelled", which is used to cancel an event, which has already been sent to the metering service, and b) the event "unknown", which is used when the type of event was not supplied by the service requestor.

The interactions between the above described software components are as follows:

Step 710: Servlet 71 receives the service request initiated by a Service Supplier, extracts the message context and passes it on to subsequent handler components.

Step 720: The message context, a shared data object, passes sequential handler components. The handlers extend/modify the message context and pass it on to the next handler in the chain.

Step 730: The Profile Handler 72 initiates a service request to an external Profile Service 72A comprising a respective database application in order to check the Service Supplier's identity.

Step 740: The Profile Service 72 returns the identity checking result to the SP's Profile Handler.

Step 750: The Contract Handler calls an external Contract Service 74A in order to identify and validate a corresponding contract: It calls the "getUsageContractsForValidForIdentity" operation and passes the service consumer identity taken from the Profile Service result. According to the invention the Contract Service 74A then selects one valid contract for this identity. In prior art, the selection is based only on the service consumer identity; it should be noted that in prior art there are no means for the service consumer or any other component to influence the selection, e.g. to specify a priority between multiple, possibly conflicting valid contracts.

Step 760: The Contract Service 74A returns the contract state and validity to the SP's Contract Handler. If no valid contract is found, an exception is thrown.

Step 770: The Metering Handler 76 invokes an external Metering Service 76A in order to generate meter events, which reflect the status of the business service call.

Step 780: The Metering Handler returns the updated message context to the Servlet.

Step 790: The Servlet 71 returns the result of the initial service call (request) to the Service Supplier in step 790.

Figure 8:
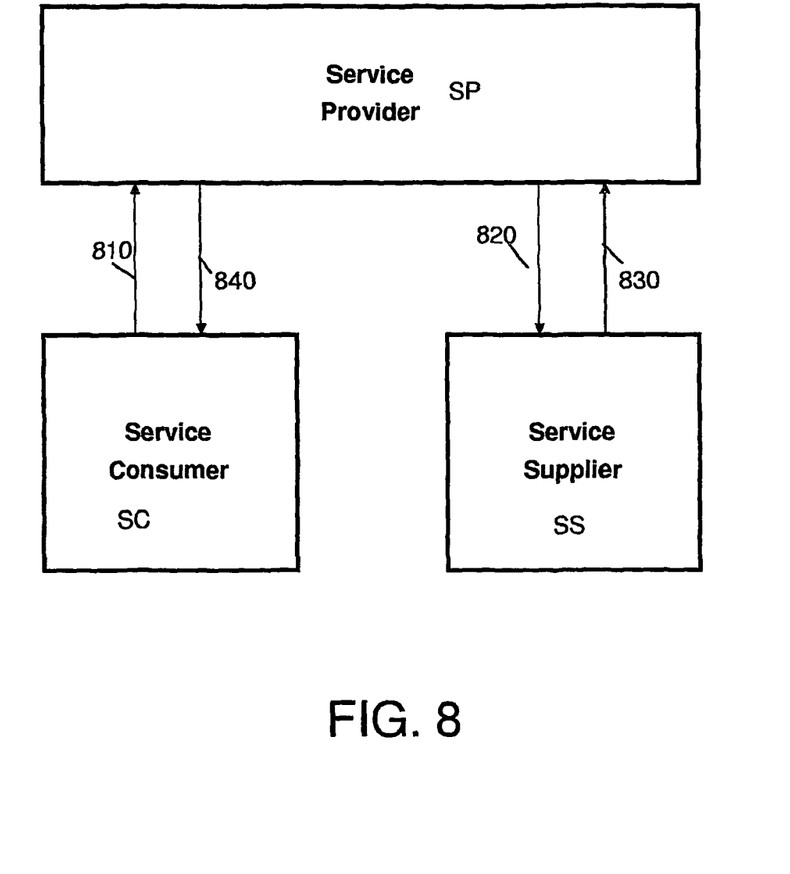
FIG. 8 is a schematic representation of the relationships between Service Consumer, Service Supplier and Service provider according to further preferred embodiment of the inventional method.
Figure 9:
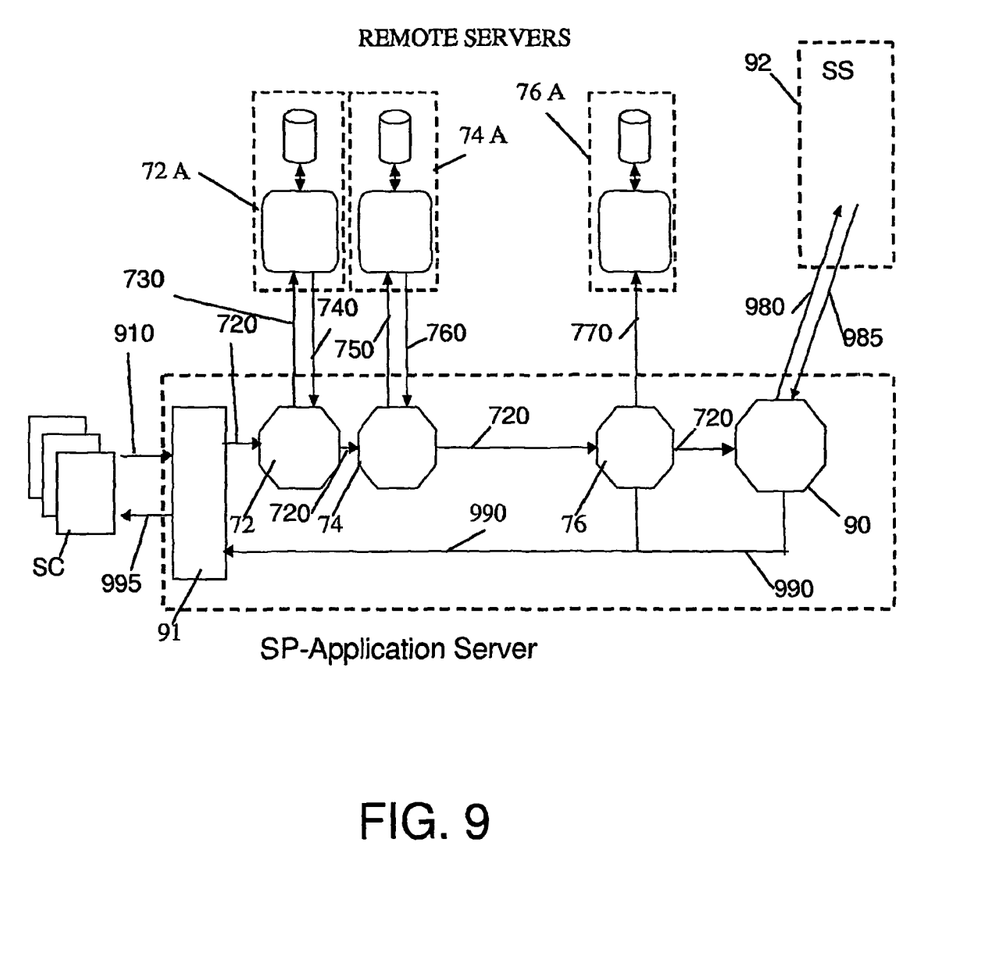
FIG. 9 is a schematic representation of the main structural elements being used in the scenario given in FIG. 8.

In an alternative scenario and with reference to FIGS. 8 and 9, the Service Provider offers the service to the Service Consumer. In order to fulfil a service request, the Service Provider requests the service from the Service Supplier. In particular, in:

Step 810: SC requests a business service from SP;

Step 820: SP uses the contract system and the infrastructure services to verify that a valid contract is available, initiates a start meter event and then requests the service from the SS;

Step 830: SS performs the service and returns results to SP; and

Step 840: SP generates end meter event and returns business service results to SC.

The inventional implementation is shown and will be described with reference to FIG. 9:

The service provider realizes an application server as described above with reference to FIGS. 6 and 7. Thus, mainly the differences are described next below:

According to this particular embodiment a Service Handler 90 invokes the external business service, which is provided by a Service Supplier (SS).

The components Servlet 91, and handlers 72, 74, 76, and 90—see right margin of FIG. 9—again run in a shared memory environment and communicate through shared data. The servlet 91 has only respective differences to that one described above in FIG. 7, which yield from the particular differences in scenario 2, and ensures that the handlers are invoked in the correct order.

A business web service 92 is an external server component provided by the Service Supplier; it is called in a step 910, in order to fulfill the requested service call.

The interactions between these components are as follows:

Step 910: Servlet 91 receives the service request initiated by a Service Consumer (SC), extracts the message context and passes it on to subsequent handler components.

Steps 720 to 770—see Scenario 1 above for reference.

Step 980: The Service Handler 90 invokes the requested business service 92 and updates the message context with the resulting service responses and in Step 985: returns it to the Service Handler 92.

Step 990: The Service Handler returns the updated message context to the Servlet 91.

Step 995: The Servlet 91 returns the result of the initial call to the Service Consumer.

Figure 10:
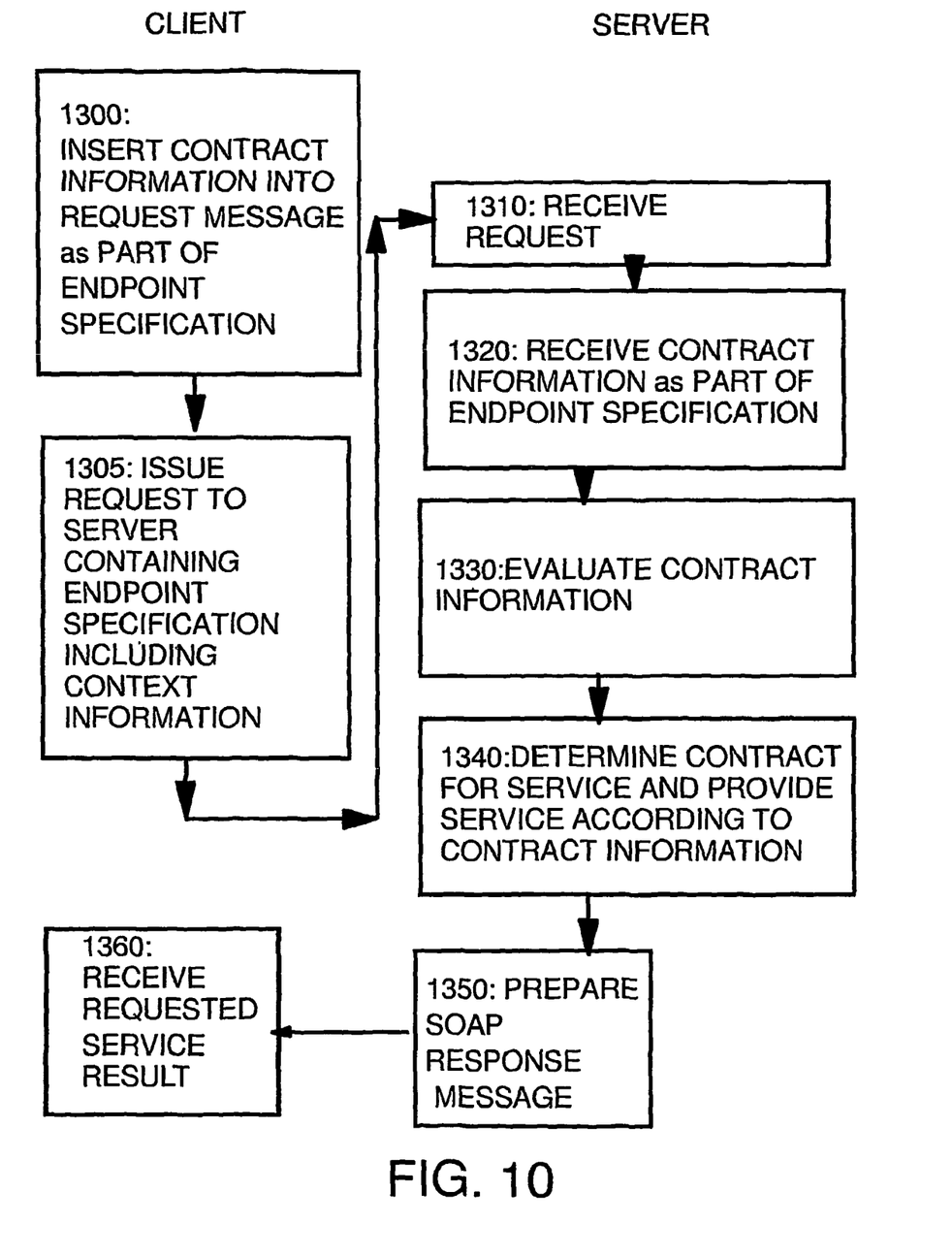
FIG. 10 is a block diagram representation showing the control flow and its relevant steps in a message exchange comprising contract selection parameters performed according to the preferred approach provided by the present invention.

According to the invention, and with reference to FIG. 10, illustrating the logic according to a preferred message exchange of the present invention incorporating contract selection data, the contract information is encoded by the client side, ie the service consumer as part of the endpoint specification of a service request, see step 1300. The endpoint is the address, where the deployed web service can be invoked on the server. It normally consists of a URL. The service request messages contain the specification of the endpoint.

The query string part does not affect the processing or routing of the message, since it is not considered for finding the service implementation by the servlet engine, the SOAP server or any prior art component. Thus, it is preferred to include the contract information therein.

Then in client step 1305 the Soap request enriched by said contract selection data, for example an Integer serving as contract identifier, is sent to the server side.

Then in step 1310 the Application server at the Provider site receives the request, receives by that the contract selection information, step 1320, and evaluates -step 1330- the contract selection information from the query string of the request. By that the server can determine -step 1340- the desired contract for the desired service and can invoke the service as detailed by the contract specifying data and parameters from the above mentioned query string.

Further, in step 1350 the respective service is assembled, a respective SOAP response message is generated, step 1350, and sent to the client, which receives that message in step 1360.

Further, the following should be noted to the inventional concept of contract selection via web:

The contract selection parameters can refer to contract metadata, like a contract identifier, which is created by a web service management component like the Contract Service, or to contract content. All variables covered by a contract like price, quality of service etc., can be referenced in content related contract selection parameters. Various contract selection parameters can be combined to create complex conditions on the selection of a contract.

Single or multiple-combined contract selection parameters can be represented as text strings conforming to a grammar understandable to both the service requester and service provider. The present invention can be used with any grammar. As an example the contract selection parameters can be represented in a XML language based on a specific XML schema. Since XML data is encoded in a string, the inventional feature of endpoint address encoding can be used to advantageously embed this contract information in the service request message.

In an exemplary case of using the present invention the service requester wants to set a price limit for a service request. He therefore chooses a suitable parameter to represent his condition ("price <$10"), which indicates the upper limit for the price and includes this parameter in the service request. This parameter refers to the content of a contract and does not explicitly select a contract by a contract ID.

In a specific embodiment of this invention, this parameter may be encoded in a XML language:

```
<contract>
    <price>
        <max>
            10
        </max>
    </price>
</contract>
```

Advantageously, the contract selection parameters can be encoded as a part of the query string of the endpoint address:

```
String
endpoint=address+"<contract><price><max>10</max></price></contract>";
```

The server selects those contracts, which are valid for the service requestor and which satisfy the condition corresponding to the given parameter.

In this example, an application server described above with reference to FIGS. 6 to 9, the server retrieves the content of the valid contracts, calculates the hypothetical price according to the contract conditions and compares this price to the price limit. Thereby the server determines the multitude of eligible contracts. If more than one contract qualifies, the server selects one according to any further logic, which may be added easily to the inventive concept described so far. If no contract qualifies, the server may throw an exception to indicate an error.

The following pseudo code example implements the server logic by evaluating conditions on fixed contract elements and variable contract elements. A fixed element does not depend on time or content of the request, examples are metadata elements (e.g. contract id) and fixed prices. A variable element depends on time of day, or on the service request, for example the service price depends on time or on other input parameters in the request message. While conditions on fixed elements can be integrated in a database query, the conditions on variable elements need to be checked by evaluating the contract and calculating the variables.

Pseudocode-begin:
Get contract info from request message;
Get contract selection parameters (CSP) from contract info;
Get fixed and variable conditions from CSP;
Select contracts from database, which
1) are valid for the requester identity AND
2) satisfy the fixed conditions;
　If no contracts are available exit with error;
　Check the variable conditions for each of the available contracts by reading the contract content and by dynamically evaluating the variables;
　If more than one contract satisfies the conditions, then perform further logic to select one (e.g. Random selection, take first one);
　　If no contract satisfies the conditions exit with error;
　Pseudocode-end This logic can be realized in the Contract Service in the getUsageContractsValidForIdentity operation mentioned above or alternatively in or more separate operations.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following
a) conversion to another language, code or notation;
b) reproduction in a different material form.

The invention claimed is:

1. A computer-implemented method for processing contract data associated with services to be provided via a computer network in an infrastructure, in which a plurality of binding contracts representing agreements about conditions for using and provisioning at least one of web services and web applications exists between a service provider comprising a server computing device and a service requestor for services comprising a client computing device having a respective number of service specifications, the method comprising the service requestor:
　creating said contract data by a contract service executing in shared memory along with a servlet and a profile service, the contract service supporting WSDL-defined operations comprising creating a contract, retrieving information and content of a contract, getting a state of a contract, setting a state of a contract and retrieving contracts which are valid for a given service consumer, said contract data comprising contract selection parameters for subsequently selecting at least one service contract out of said plurality of contracts, the at least one service contract representing an agreement about conditions for using and provisioning at least one of a web service and a web application existing between the service provider and the service requestor;
　including said contract data into a request for a service by encoding said contract data into an endpoint specification of the request for said service, said service being one of the web service and the web application;
　issuing, via the computer network, said request for said service containing the endpoint specification, so that at least one service contract which satisfies the conditions corresponding to the contract selection parameters can be selected; and
　receiving, via the computer network, the service in a Simple Object Access Protocol (SOAP) response message according to a selection of the at least one service contract based upon the contract selection parameters,
　the selecting of the at least one service contract enabling the service requestor to select conditions for a desired service since the contract selection parameters specify contract selections as part of the service request and thus supporting stateless web services.

2. The method according to claim 1, wherein
said contract data is processed via software interfaces adapted to comprise said contract data, said interfaces comprising respective definitions of the transport protocol in use, of the messaging protocol in use and on an associated port type in use.

3. The method according to claim 1, wherein
said contract data is processed within header fields of a web service request.

4. The method according to claim 1, wherein
said contract selection parameters are transported in a SOAP message conforming to the SOAP standard.

5. The method according to claim 1, wherein
multiple contract selection parameters are combined in a single service request.

6. The method according to claim 1, wherein
said contract selection parameters comprise meta-data identifying a particular contract.

7. A service requestor computer server hardware system for processing contract data associated with services to be provided via a computer network in an infrastructure in which a plurality of binding contracts representing agreements about conditions for using and provisioning at least one of web services and web applications exists between a service provider comprising a server computing device and a service requestor for services comprising a client computing device having a respective number of service specifications, the system comprising:
　at least one processor of the service requestor, wherein the at least one processor configured for
　　creating said contract data by a contract service executing in shared memory along with a servlet and a profile service, the contract service supporting WSDL-defined operations comprising creating a contract, retrieving information and content of a contract, getting a state of a contract, setting a state of a contract and retrieving contracts which are valid for a given service consumer, said contract data comprising contract selection parameters for subsequently selecting at least one service contract out of said plurality of contracts, the at least one service contract representing an agreement about conditions for using and provisioning at least one of a web service and a web between the service provider and the service requestor;
　　including said contract data into a request for a service by encoding said contract data into an endpoint specification of the request for said service, said service being one of the web service and the web application;

issuing said request for said service via the computer network containing the endpoint specification, so that at least one service contract which satisfies the conditions corresponding to the contract selection parameters can be selected; and2 receiving, via the computer network, the service in a Simple Object Access Protocol (SOAP) response message according to a selection of the at least one service contract based upon the contract selection parameters, the selecting of the at least one service contract enabling the service requestor to select conditions for a desired service since the contract selection parameters specify contract selections as part of the service request and thus supporting stateless web services.

8. The system according to claim 7, wherein
said contract data is processed via software interfaces adapted to comprise said contract data, said interfaces comprising respective definitions of the transport protocol in use, of the messaging protocol in use and on an associated port type in use.

9. The system according to claim 7, wherein
said contract data is processed within header fields of a web service request.

10. The system according to claim 7, wherein
said contract selection parameters are transported in a SOAP message conforming to the SOAP standard.

11. The system according to claim 7, wherein
multiple contract selection parameters are combined in a single service request.

12. The system according to claim 7, wherein
said contract selection parameters comprise meta-data identifying a particular contract.

13. A non-transitory computer usable tangible medium having computer readable instructions embodied therein for processing contract data associated with services to be provided via a computer network in an infrastructure in which a plurality of binding contracts representing agreements about conditions for using and provisioning at least one of web services and web applications exists between a service provider comprising a server computing device and a service requestor for services comprising a client computing device having a respective number of service specifications, the computer readable instructions, when executed on the service requestor, causing the service requestor to perform the operations comprising:

creating said contract data by a contract service executing in shared memory along with a servlet and a profile service, the contract service supporting WSDL-defined operations comprising creating a contract, retrieving information and content of a contract, getting a state of a contract, setting a state of a contract and retrieving contracts which are valid for a given service consumer, said contract data comprising contract selection parameters for subsequently selecting at least one service contract out of said plurality of contracts, the at least one service contract representing an agreement about conditions for using and provisioning at least one of a web service and a web application existing between the service provider and the service requestor;

including said contract data into a request for a service by encoding said contract data into an endpoint specification of the request for said service, said service being one of the web service and the web application;

issuing, via the computer network, said request for said service containing the endpoint specification, so that at least one service contract which satisfies the conditions corresponding to the contract selection parameters can be selected; and receiving, via the computer network, the service in a Simple Object Access Protocol (SOAP) response message according to a selection of the at least one service contract based upon the contract selection parameters, the selecting of the at least one service contract enabling the service requestor to select conditions for a desired service since the contract selection parameters specify contract selections as part of the service request and thus supporting stateless web services.

14. The non-transitory computer usable tangible medium according to claim 13, wherein
said contract data is processed via software interfaces adapted to comprise said contract data, said interfaces comprising respective definitions of the transport protocol in use, of the messaging protocol in use and on an associated port type in use.

15. The non-transitory computer usable tangible medium according to claim 13, wherein
said contract data is processed within header fields of a web service request.

16. The non-transitory computer usable tangible medium according to claim 13, wherein
said contract selection parameters are transported in a SOAP message conforming to the SOAP standard.

17. The non-transitory computer usable tangible medium according to claim 13, wherein
multiple contract selection parameters are combined in a single service request.

18. The non-transitory computer usable tangible medium according to claim 13, wherein
said contract selection parameters comprise meta-data identifying a particular contract.

19. A computer-implemented method for processing contract data associated with services to be provided via a computer network in an infrastructure, in which a plurality of binding contracts exists representing agreements about conditions for using and provisioning at least one of web services and web applications between a service provider comprising a server computing device and a service requestor for services comprising a client computing device having a respective number of service specifications, the method comprising the service provider:

receiving, said contract data from a contract service executing in shared memory along with a servlet and a profile service, the contract service supporting WSDL-defined operations comprising creating a contract, retrieving information and content of a contract, getting a state of a contract, setting a state of a contract and retrieving contracts which are valid for a given service consumer, via the computer network, said contract data encoded into an endpoint specification included in a request with which a service is requested, wherein said contract data comprises contract selection parameters for selecting at least one service contract out of said plurality of contracts, the at least one service contract representing an agreement about conditions for using and provisioning at least one of a web service and a web application existing between the service provider and the service requestor, and said service being one of the web service and the web application;

evaluating said contract selection parameters by evaluating said request;

determining said plurality of contracts that satisfy the conditions corresponding to the contract selection parameters;
selecting one particular contract from said plurality of contracts; and
providing, via the computer network, the service in a Simple Object Access Protocol (SOAP) response message to the service requestor according to said particular contract,
the selecting of the one particular contract enabling the service requestor to select conditions for a desired service since the contract selection parameters specify contract selections as part of the service request and thus supporting stateless web services.

* * * * *